May 12, 1942. F. C. SCHUELER 2,282,750
PROCESS OF MAKING PLUG JACKETS
Filed April 19, 1939 3 Sheets-Sheet 1

INVENTOR.
Fred C. Schueler
BY Gardner W. Pearson
ATTORNEY.

May 12, 1942.  F. C. SCHUELER  2,282,750
PROCESS OF MAKING PLUG JACKETS
Filed April 19, 1939  3 Sheets-Sheet 2

INVENTOR.
Fred C. Schueler
BY Gardner W. Pearson
ATTORNEY.

Patented May 12, 1942

2,282,750

UNITED STATES PATENT OFFICE 2,282,750

PROCESS OF MAKING PLUG JACKETS

Fred C. Schueler, Andover, Mass., assignor to John W. Bolton & Sons, Inc., Lawrence, Mass., a corporation of Massachusetts Application April 19, 1939, Serial No. 268,720

11 Claims. (Cl. 29—148.2)

This invention relates to a process for making pre-assembled built-up liners or jackets for Jordan engine plugs. The usual type of Jordan engine plugs is a truncated conical casting or it may include a central shaft which carries a plurality of spiders or wheels of gradually increasing or decreasing diameter which form a skeleton truncated cone. Until recently, the outside of these plugs was formed with longitudinal slots in the body or in annular projections into which bars were set, there being also endless bands associated with the rings under which a tongue formed by an open notch at the inside or bottom edge of each bar extended. Part of the space between the bars was filled with separators generally of wood.

Assembling the bars and separators on the actual plug in a paper mill was and is a slow, difficult and expensive job. A bodily removable and attachable liner or jacket which could merely be slipped on the plug has been the objective of numerous inventors.

It has been impossible to provide a cast plug which is satisfactory and in which the edges of the cutting bars were sufficiently hard. A split liner of knives and separators held together by wires or rods has been used for the inside lining of a Jordan shell, but no way of closing the split and to hold the assembly rigid enough to resist the tremendous centrifugal force created by a modern plug traveling from 2000 to 4000 surface feet per minute has so far been found practical.

A pre-assembled banded plug jacket with endless bands under which tongues pass has been described, but this is objectionable, as are all banded plugs, because their holding together depends on the strength of the tongue. It has been found that plug bars traveling at terriffic speed at only 1/64 or 1/32 of an inch from the knives must positively be prevented from moving out radially. The so-called banded plugs are too weak. Another type is shown in the patent to Bolton, No. 1,829,630 of October 27, 1931, where lengthwise slots are milled in a plug having a continuous curved face, the opening of each slot being narrower than the interior and into these slots the inner side of straight bars having the same contour have been driven or pushed from one end. In this same device, to prevent the separators from being thrown out, the bars have been provided with longitudinal projections or ribs which engage suitable grooves in the separators, thus holding them in position.

While the bars and separators of a plug look much like the knives and separators of a Jordan shell, because in the shell the knives converge toward the center and the separators are held in place by that converging, the fact is that on the outside of the plug the bars and separators must be held in and firmly locked in place, whether they are separate units or are assembled as a jacket.

Obviously, it would be impossible to merely place bars and separators around the outside of a plug as can be done on the inside of a shell and while it might be possible to glue them together, it is doubtful if there is any adhesive which would hold. Shell liners can be held at the ends only and plug jackets might be so held but the middle part of the assembled bars and separators will be thrown outward, causing a bulge, unless the middle is held together in some way, as shown by Riehm in his Patent No. 2,008,228 of July 16, 1935.

Moreover, as wooden separators swell when wet, this tends to squeeze parts of a shell lining together, but on a plug jacket it might enlarge the circumference and loosen the whole jacket from the plug. In a pre-assembled plug jacket made up of metal bars and separators of wood, it is quite necessary that the parts should be squeezed together so as to make a good fit and that they should all then be anchored in place, as by metal of some sort, so that the inner faces of the jacket will not become loose from the outer face of the plug and so that, either as an assembly or separately, the bars will not move out radially and hit the knives in the shell.

The plug linings of jackets which can be and are produced by this process are shown and described in applicant's applications as follows: Schueler, filed April 8, 1939, Serial No. 266,777, Inseparable assembled plug jacket; Schueler, filed June 9, 1939, Serial No. 278,321, Plug jacket with re-inforced metal bands.

This invention is the process of stringing bars and separators on rods or wires which pass through holes in both the bars and separators; and of then squeezing the assembly of bars and separators together on the rods or wires to make a close fit, and preferably to compress the separators; and of then locking them in their squeezed or compressed condition on the rods or wires.

The result might be obtained in some other way, but this process is first to string the bars and separators on the rods or wires. This can be done in a conical outside form, or they can be strung and the assembly put in the large end of a conical outside form. In either case, I put blocks between the rods or wires and the end bars.

Preferably, an inside conical form is used to position the inside faces. Second, the assembly, with or without the inside form, is pushed towards the small end of the outside form, thus crowding the parts together circumferentially and causing the ends of the wires to protrude from the end bars. Third, the bars and separators are locked in the squeezed condition on the rods or wires by any one of several methods to be described.

If I use springy metal rods of circular form, the need of the inside form is reduced, but the movements of the assembly in the outside form and of the inside form with relation to it can be varied according to the circumstances and the result desired.

In the drawings, Fig. 1 shows a side elevation of the bars, and Fig. 2 shows isometric views of two sizes of separators, together with an elevation of the special separator.

Figure 5:
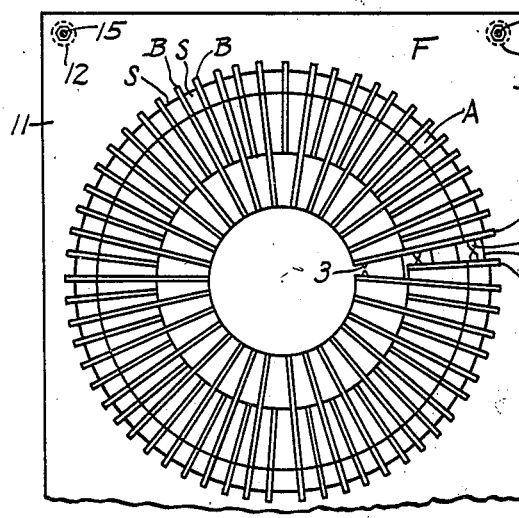
Fig. 5 is an elevation from the large end of the outside form with the assembly in place, without the pressure plate.
Figure 5A:
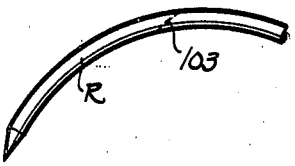

Fig. 5—A is a detail showing one end of a preferred type of elastic annular rod.

Figure 6:
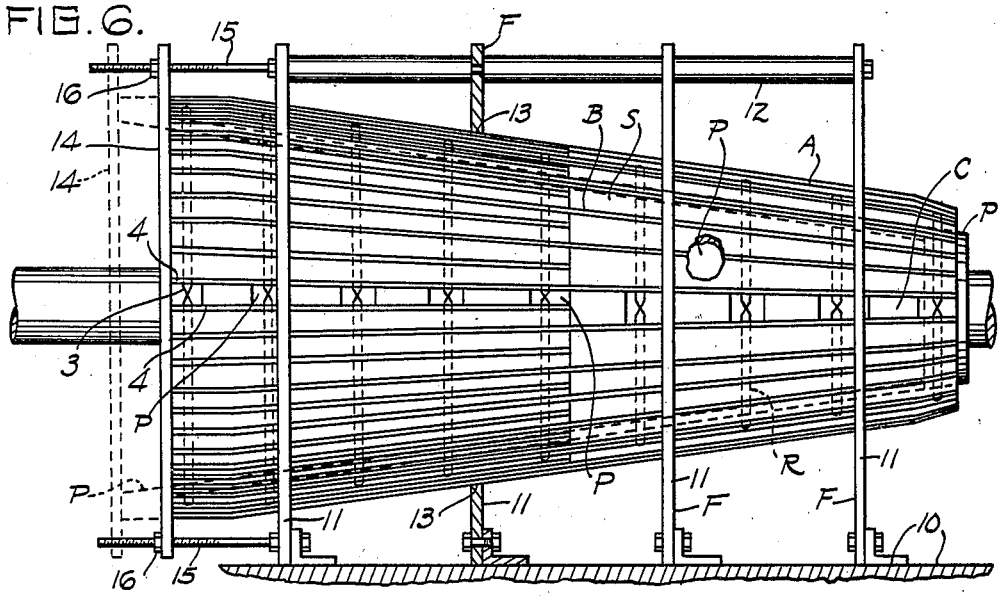

Fig. 6 is a side elevation showing an outside and an inside form with the assembly between them.

Figure 7:
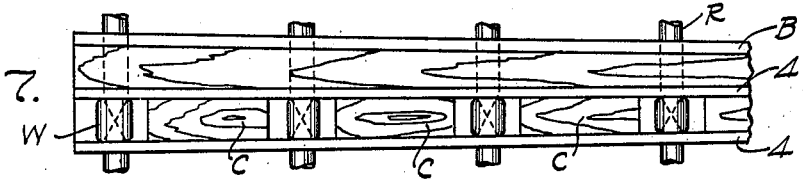
Figure 8:
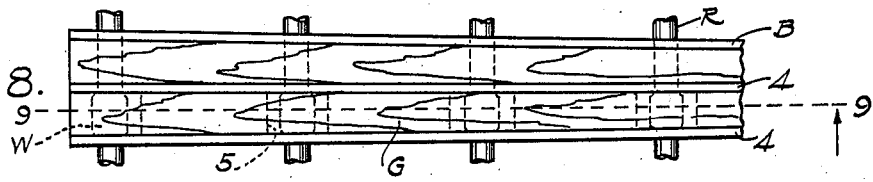

Fig. 7 is a detail showing the welded ends of the rods before the temporary blocks are removed, and Fig. 8 is a similar view after the temporary blocks have been removed and the special separator is in position.

Figure 9:
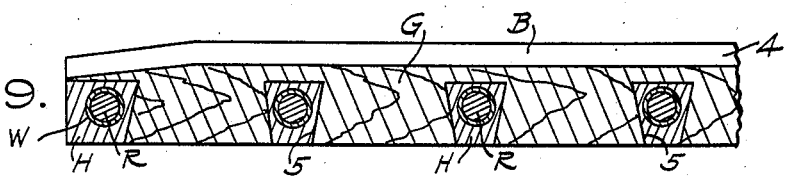
Figure 10:
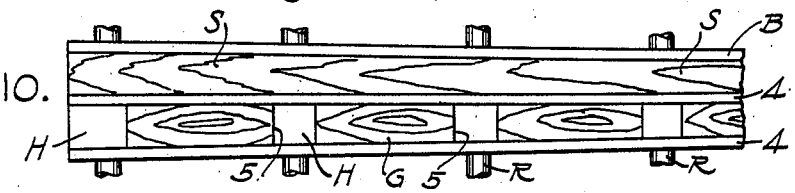

Fig. 9 is a sectional elevation on the line 9—9 of Fig. 8, but after the notches have been filled with melted metal, and Fig. 10 is a detail showing the inside of the special separator and the adjoining parts after such notches have been filled.

Figure 11:
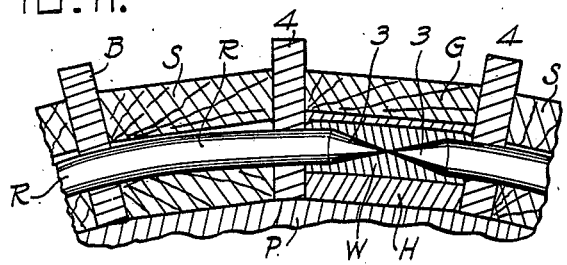
Figure 12:
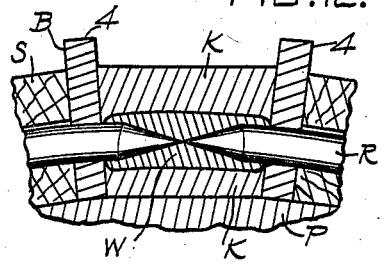

Figs. 11 and 12 are transverse sectional views more or less diagrammatic on a plane which cuts through the ends of the elastic rods, Fig. 11 showing a special separator and Fig. 12 showing another construction.

Figure 13:
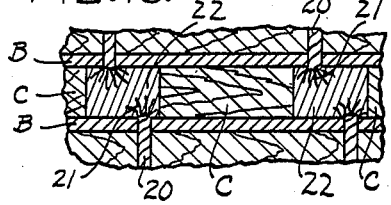
Figure 14:
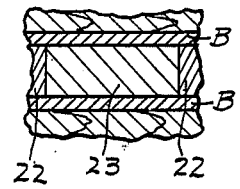
Figure 15:
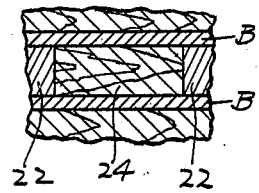

Figs. 13, 14 and 15 are sections on planes which extend lengthwise and cut through the end bars showing different connections.

Figure 16:
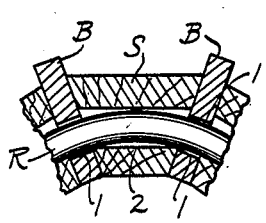
Figure 17:
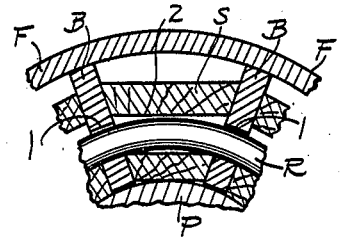
Figure 18:
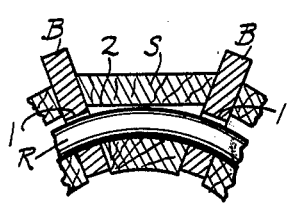

In Figs. 16, 17 and 18, an attempt has been made to show diagrammatically what it is believed occurs between the bars, separators and rods in various stages of the process, the views being shown on planes which cut through the rods at right angles to the axis of the assembly.

Figure 19:
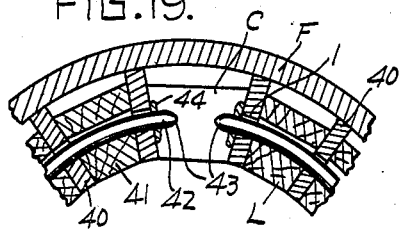
Figure 20:
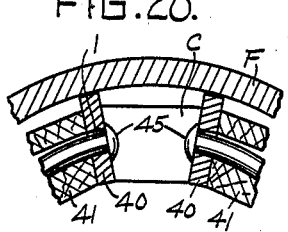
Figure 21:
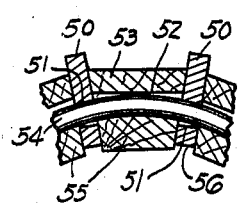

Figs. 19 and 20 are views similar to Figs. 11 and 12 showing other methods of treating the ends of the rods, and Fig. 21 is a view similar to Fig. 18 showing what can happen with a different arrangement of holes.

Figure 22:
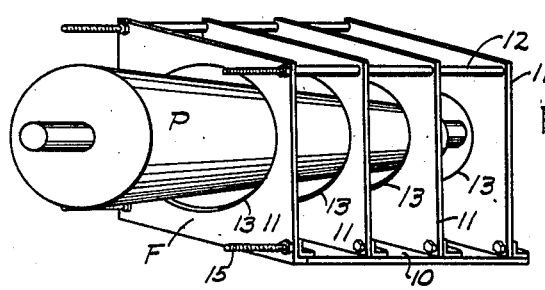

Fig. 22 is an isometric view showing diagrammatically an inside and an outside form.

In the drawings, B represents bars, some of which are shown as being long and some short. These bars B, B are all shown as of rectangular cross section and as being made with closed holes, such as 1. S represents separators, shown also as of two widths, both of slightly keystone cross section and each provided with closed holes, such as 2.

R represents wires or rods which are preferably, except at the ends, made of stiff springy metal bent around in the form of an almost complete perfect ring or circle, the ends, such as 3, being shown as pointed and as being normally a slight distance apart. When springy wire rods are used, they should be formed as a perfect circle with the ends 3, 3 almost touching. These ends need not be springy.

Figure 1:
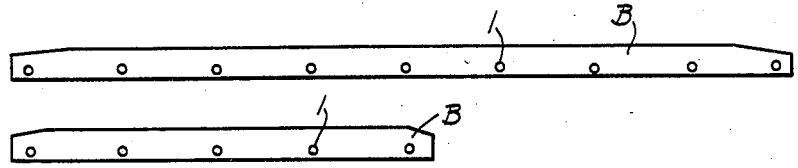
Figure 2:
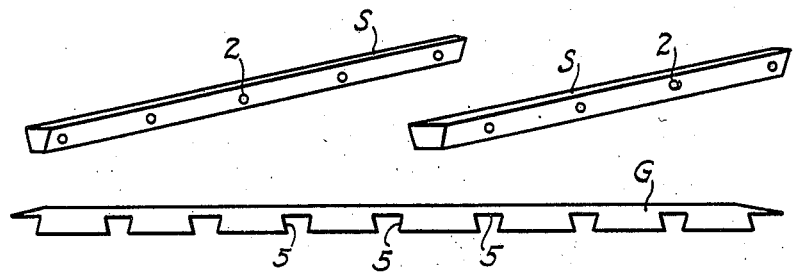
Figure 3:
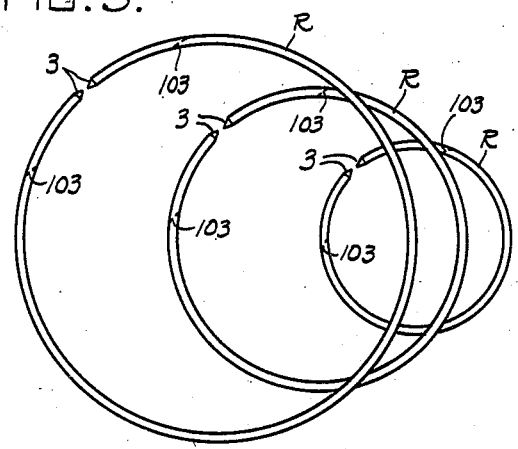
Fig. 3 is an elevation showing various sizes of wires or metal rods.

I prefer to make rods, such as R, of an elastic alloy steel and to form them in a perfect circle when annealed and to then heat treat or harden all of the rod, except the ends 3, 3 which are left without heating, as far back as the lines 103, indicated in Figs. 3 and 5—A. The purpose of this is to permit the tips of these ends to be welded or buried in hot metal without being weakened, but so that the ends can be sprung apart to allow the bars and separators to be strung on them and so that the rods will then spring back and return to their original perfect circles.

Figure 4:
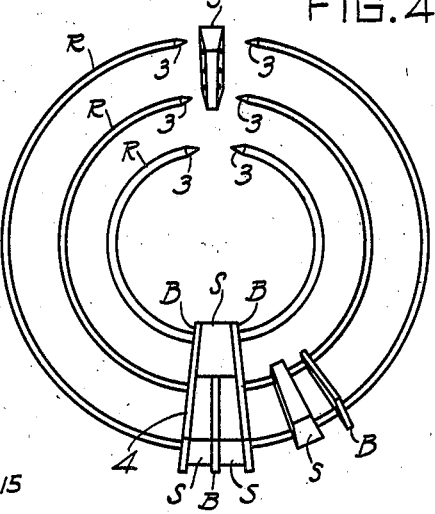
Fig. 4 is a more or less diagrammatic elevation from the large end showing elastic rods with their ends sprung apart as they are while the bars and separators are being strung on them.

As shown in Fig. 4, the pointed ends 3 are pulled apart enough to allow them to pass through the holes 1 and 2 in the bars B and separators S, the whole assembly being built up, as shown in Fig. 5, until the assembly is complete, except the space between the last two long end bars 4, 4. Temporary blocks C of keystone cross section are now put or driven into position between the end bars and the rods R and then the entire assembly if assembled outside form F, is put into it, as shown by the dotted lines in Fig. 6.

This outside form F comprises a base 10 from which project a plurality of plates 11, 11 which are also held together by braces 12, each plate being provided with a circular hole, such as 13.

These holes have smaller and smaller tapered diameters as they go down and are of such size that when the assembly A is made in or is put into the large end and pushed in, as by means of a pressure plate 14 and bolts 15 with nuts 16, or by a hydraulic, pneumatic or mechanical press, from the position shown in the dotted lines to the position shown in the full lines, the outer circumference at all points is somewhat reduced.

Blocks C, C will not yield but the separators S will yield and fit the bars B. This yielding causes the ends 3, 3 of the wires R to be exposed and with sufficient pressure to approach each other.

Preferably, I use an inside form or guide P, of the size of the plug for which the jacket is being made, to define the size of the inner face of the jacket and to co-operate with form F in compelling the parts to go where they should go. After the members of the assembly are squeezed together, I prefer to force plug P in until all the inside faces of the bars and separators coincide with its curved surface or are at tangents to it, as shown in Fig. 17. Forms F and P are shown in Fig. 22.

As form F is of the skeleton type, the ends 3, 3 of each of the various rods are now welded together, as shown at W, the welding material preferably extending between the two end bars 4, 4 to prevent them from slipping towards each other. The condition of the ends before welding is shown in Fig. 6 and after welding, before the blocks C are removed, is shown in Fig. 7.

In Figs. 2, 9, 10 and 11 is shown a special separator G which may be made of wood or other suitable material and which has at its inner edge open transverse notches or slots which are smaller at the outside than at the inside. Those shown at 5 are of dovetail shape. After the welding, the blocks C can be removed, see Fig. 7, and the welding will hold the end bars 4, 4 in position so that a special separator G can be forced or driven in radially between them, the notches 5 passing over the welds W. Melted metal or other suitable plastic material, such as cement H, is then poured or forced into each notch 5 to fill it around the weld W so as to hold or lock each special separator G in place. See Figs. 9 and 11. If metal is used, it also reenforces the welding W. Instead of using a special separator, such as G, I can fill the space, which it would have occupied, with melted metal, plastic, or other suitable material K, as shown in Fig. 12.

Instead of using rods, such as R, I can use twisted wire cables 20 and can spread out or brush the ends 21, 21, as shown in Figs. 13, 14 and 15. While so spread out, I can fill the spaces between blocks C, C with melted metal 22 which, when it hardens, permanently connects the ends of these cables so that they cannot escape. After the metal has hardened, it will hold the parts in place. The blocks C, C can then be removed and the space left can be filled with a material, such as plastic wood or cement 23, as shown in Fig. 14, or by short sections of separators, such as 24, which can be driven in radially so as to entirely fill the gap, as shown in Fig. 15.

In Figs. 16, 17 and 18, the endeavor has been made to show what happens to the separators and bars during the circumferential squeezing, locking and after the assembly is on the plug and soaked with water.

These illustrations are as near as can be figured on what actually happens where, as contemplated, straight holes are bored through the bars and straight holes are bored through the separators, the inner edge of the bars being in a flat plane and the inner edge of the separators being also in a flat plane. As there are a large number of pieces, it is obvious that a very small amount of slippage radially, either outward or inward, unless controlled, would materially vary the size and if this type of jacket was held to the plug by friction, the jacket would slip, if its inner circumference increased.

The arrangement of the parts when the bars and separators are first strung on the rods is shown in an exaggerated manner in Fig. 16. In Fig. 17, the arrangement of the parts is shown after being compressed while in contact on the inside with the inside form P. Fig. 18 shows what happens to the separators, if made of wood or other material which will swell in water, after such swelling, although the same result can be obtained by sufficient pressure in the forms.

The preferred procedure is to assemble bars and separators on the wires and put the blocks between the first and last bars, the assembly taking place in the outside form.

By wire, I include relatively stiff rods, cable of twisted wires, or flexible wires.

The second move is to push the form P inside the assembly so as to define its inside curved surface so that the parts will be in or tangent to a truncated conical curve approximating that of the plug for which it is being made.

The third move is to force this assembly, together with the inside form P, into the outside form. The assembly being held between the inside and the outside form, the only thing that can yield is the space between the bars and separators and the separators themselves. If these are of wood, or other compressible material, they are compressed between the bars as the circumference at every point is reduced by this pushing in. This also causes the ends of the wires to project so that they can be and are fastened together and locked in position preferably by welding, or being buried in metal, the metal extending between the end bars so that there can be no more yielding.

The purpose of the inside form P is to define the inside size and shape of the finished jacket and to prevent the jacket from collapsing while being squeezed. However, the process can be carried out without the inside form or plug, particularly if substantial springy wire rods are used for assembling the bars and separators. With such a construction, there is only the assembling and squeezing, as well as the locking, the squeezing being done by a single pushing in of the assembly.

Where a curved, springy rod is used, the holes through the bars being straight must be a little larger in diameter and the holes through the separators must be considerably larger than the rods, but if a flexible cable is used, the holes can be somewhat smaller as the cable can more nearly fit the hole.

Many variations of the plug jacket can be made by changing the size and location of the holes through the bars and separators and by using the inside form or omitting it, or using it first or last. When the squeezing is going on, there is a tendency for the keystone shaped separators to push out unless restrained by the rods or wires engaging the inner side of the holes. On the other hand, if the holes in the bars and separators are so made that the separators cannot move out but the bars can, that will produce a slightly different result, but where the holes are so made that neither can move out, the inside faces of the bars and separators will maintain their original alignment with each other.

As shown in Fig. 19, this process can be used to make a split jacket L including bars 40 and separators 41 strung on wires 42 in the form F. Blocks C are put in place and the assembly forced towards the small end, thus causing the ends 43, 43 of wires 42 to project. To hold the parts in place and the separators 41 compressed, the wires can be welded at 44 to the end bars or, as shown in Fig. 20, the wires can be cut and headed over as rivets 45.

It is characteristic of this process that the circumferential pressure applied to the straight edged bars on each side of a keystone shaped separator tends to force the separator out radially, but there is also the forcing of the material of the separator outwardly and inwardly radially, the pressure preferably being so regulated that the resiliency is not lost as this helps to keep the whole assembly tight against the locking means at the ends of the wires.

In some cases, as shown in Fig. 21, it is desirable to have no contact between the bars and the face of the plug to which the assembly is applied. This can be accomplished by using bars 50 with holes 51 and separators 53 with holes 52 through which passes the wire 54, all being so arranged that the inside faces 55 of the separators extend inward beyond the inside faces 56 of the bars 50.

I claim:

1. The process of making an unsplit jacket for Jordan engine plugs which consists of stringing bars and separators, each having a plurality of closed holes, on curved metal wires which pass through the holes; of then squeezing the bars and separators together circumferentially; of then while under pressure welding the ends of the wires together; and of then filling part of the space around each weld and between the adjoining end bars with a soft material which is allowed to harden.

2. The process of making an unsplit jacket for Jordan engine plugs which consists of stringing bars and separators, each having a plurality of closed holes, on curved metal wires each wire being in the form of a split ring with the ends proximate which wires pass through the holes; of then squeezing the bars and separators together circumferentially; and of then while under pressure welding the ends of the wires together.

3. The process of making an elastic, unsplit jacket for Jordan engine plugs which consists of stringing bars and separators, each having a plurality of closed holes, on curved metal wires which pass through the holes; of then squeezing the bars and separators together circumferentially; of then while under pressure fastening the ends of the wires together; and of then filling part of the space around the ends and between the adjoining end bars with melted metal.

4. The process of making a plug jacket comprising bars and separators which consists of stringing them on metal wires; of then squeezing the bars and separators together circumferentially; and of then while under pressure fastening the ends of the wires together and filling part of the space between the two end bars with melted metal.

5. The process of making an unsplit jacket for Jordan engine plugs which consists of stringing bars and separators, each having a plurality of closed holes, on curved metal wires each wire being in the form of a split ring with the ends proximate which wires pass through holes; of then squeezing the bars and separators together circumferentially; and of then fastening the ends of each wire together by melted metal.

6. The process of making an elastic jacket for Jordan engine plugs which consists of stringing bars and separators, each having a plurality of closed holes, on curved metal wires which pass through the holes; of completing the circle by placing blocks between the last members and between some of the wires; of then squeezing the bars, blocks and separators together; of then while under pressure fastening the ends of the wires together; and of then filling part of the space around the ends and between the adjoining end bars with melted metal.

7. The process of making an elastic jacket for Jordan engine plugs which consists of stringing bars and separators, each having a plurality of closed holes, on curved metal wires each wire being in the form of a split ring with the ends proximate which wires pass through the holes; of completing the circle by placing blocks between the last members and between some of the wires; of then squeezing the bars, blocks and separators together; and of then while under pressure locking the bars and separators in place on the wires.

8. The process of making a plug jacket comprising bars and separators which consists of stringing them on metal wires; of placing temporary blocks between the end bars; of forcing the assembly with an inside conical guide from the large end towards the small end of an outside conical form to squeeze the separators until the ends of the wires project; of locking the parts in the squeezed position; and of then removing the temporary blocks.

9. The process of making a plug jacket comprising bars and separators which consists of stringing them on metal wires; of placing temporary blocks between the end bars; of squeezing the assembly until the ends of the wires project; of locking the parts in the squeezed position; and of then removing the temporary blocks.

10. The process of making a lining section for a Jordan engine which consists of assembling the members on the inside of an outside conical form and of then squeezing, tightening and defining their positions by moving an inside conical form and the members axially with reference to the outside conical form with both forms in place.

11. The process of assembling, tightening and squeezing the members of a Jordan lining, which consists of positioning them between an outside conical form and an inside conical form and of moving the parts axially with both forms in place.

FRED C. SCHUELER.